United States Patent
Singh (10) Patent No.: US 10,620,900 B2
(45) Date of Patent: Apr. 14, 2020

(54) REPUTATION SHARING SYSTEM USING AUGMENTED REALITY SYSTEMS

(71) Applicant: PCMS Holdings, Inc., Wilmington, DE (US)

(72) Inventor: Mona Singh, Cary, NC (US)

(73) Assignee: PCMS Holdings, Inc., Wilmington, DE (US)

( * ) Notice: Subject to any disclaimer, the term of this patent is extended or adjusted under 35 U.S.C. 154(b) by 0 days.

(21) Appl. No.: 15/512,018

(22) PCT Filed: Aug. 14, 2015

(86) PCT No.: PCT/US2015/045362
§ 371 (c)(1),
(2) Date: Mar. 16, 2017

(87) PCT Pub. No.: WO2016/053486
PCT Pub. Date: Apr. 7, 2016

(65) Prior Publication Data
US 2017/0293947 A1 Oct. 12, 2017

Related U.S. Application Data

(60) Provisional application No. 62/057,536, filed on Sep. 30, 2014.

(51) Int. Cl.
*B60W 30/08* (2012.01)
*G06F 3/14* (2006.01)
(Continued)

(52) U.S. Cl.
CPC ........... *G06F 3/1454* (2013.01); *B60W 30/08* (2013.01); *G06F 3/011* (2013.01); *G06F 3/012* (2013.01);
(Continued)

(58) Field of Classification Search
None
See application file for complete search history.

(56) References Cited

U.S. PATENT DOCUMENTS

| 8,953,841 B1 * | 2/2015 | Leblang | G06K 9/00671 345/633 |
| 2001/0005285 A1 * | 6/2001 | Tanaka | G02B 27/017 359/630 |

(Continued)

FOREIGN PATENT DOCUMENTS

WO 2013183957 A1 12/2013

OTHER PUBLICATIONS

International Search Report and Written Opinion for PCT/US2015/045362, dated Oct. 29, 2015.
(Continued)

*Primary Examiner* — David H Chu
(74) *Attorney, Agent, or Firm* — Invention Mine LLC (57) ABSTRACT

A method and system for operating a reputation sharing system is disclosed. The method includes detecting an object of interest at an augmented reality system. The method also includes receiving user annotation information, detecting and preparing object recognition information, and detecting and preparing motion information associated with the object of the interest at the augmented reality system. The augmented reality system sends a set of information associated with the object of interest to a reputation service. The set of information includes the object recognition information, the motion information, and the annotation information.

16 Claims, 10 Drawing Sheets

(51) Int. Cl.
*G06F 3/147* (2006.01)
*G06F 3/01* (2006.01)
*H04B 1/3827* (2015.01)

(52) U.S. Cl.
CPC .............. *G06F 3/013* (2013.01); *G06F 3/147* (2013.01); *H04B 1/385* (2013.01); *G09G 2340/12* (2013.01); *G09G 2380/10* (2013.01); *H04B 2001/3866* (2013.01)

(56) References Cited

U.S. PATENT DOCUMENTS

| | | | |
|---|---|---|---|
| 2004/0158738 A1* | 8/2004 | Tanaka | H04L 63/105 713/166 |
| 2007/0016372 A1* | 1/2007 | Browne | G01C 21/005 701/469 |
| 2007/0282532 A1* | 12/2007 | Yamamoto | B60R 21/0134 701/301 |
| 2009/0265087 A1* | 10/2009 | Hessling | G08G 1/092 701/117 |
| 2010/0195872 A1 | 8/2010 | Velardo | |
| 2010/0257252 A1 | 10/2010 | Dougherty | |
| 2010/0325563 A1 | 12/2010 | Goldthwaite | |
| 2011/0034183 A1* | 2/2011 | Haag | G06Q 50/26 455/456.3 |
| 2011/0165917 A1 | 7/2011 | Taylor | |
| 2011/0301995 A1* | 12/2011 | Fukuda | G06Q 10/06 705/7.16 |
| 2012/0046072 A1 | 2/2012 | Choi | |
| 2012/0075168 A1* | 3/2012 | Osterhout | G02B 27/017 345/8 |
| 2012/0194554 A1* | 8/2012 | Kaino | G08B 13/19613 345/633 |
| 2012/0233032 A1 | 9/2012 | Calman | |
| 2012/0270558 A1* | 10/2012 | Busch | H04W 76/40 455/456.1 |
| 2012/0293548 A1 | 11/2012 | Perez | |
| 2012/0299962 A1* | 11/2012 | White | G02B 27/017 345/633 |
| 2013/0050258 A1* | 2/2013 | Liu | G02B 27/017 345/633 |
| 2013/0083063 A1* | 4/2013 | Geisner | G06F 3/011 345/633 |
| 2013/0093788 A1* | 4/2013 | Liu | G06F 3/011 345/633 |
| 2013/0187951 A1 | 7/2013 | Suzuki | |
| 2013/0324310 A1* | 12/2013 | Leech | A63B 57/00 473/371 |
| 2014/0064557 A1* | 3/2014 | Hara | G06F 3/017 382/103 |
| 2014/0085109 A1* | 3/2014 | Stefik | G06Q 10/02 340/932.2 |
| 2014/0168056 A1 | 6/2014 | Swaminathan | |
| 2014/0171039 A1* | 6/2014 | Bjontegard | H04W 4/029 455/414.1 |
| 2014/0267411 A1* | 9/2014 | Fein | G06T 11/00 345/633 |
| 2014/0368373 A1* | 12/2014 | Crain | G01S 5/02 342/5 |
| 2014/0375684 A1* | 12/2014 | Algreatly | G06T 19/006 345/633 |
| 2015/0039635 A1* | 2/2015 | Monjas Llorente | H04L 65/605 707/754 |
| 2015/0113664 A1* | 4/2015 | Aad | G06K 9/00288 726/27 |
| 2015/0187139 A1* | 7/2015 | Ahn | G06F 16/5866 345/633 |
| 2015/0213634 A1* | 7/2015 | Karmarkar | G06T 11/60 345/589 |
| 2015/0248783 A1* | 9/2015 | Fayle | G06T 19/006 345/633 |
| 2015/0262487 A1* | 9/2015 | Cazanas | G08G 1/166 701/301 |
| 2016/0049005 A1* | 2/2016 | Mullins | G06T 19/006 345/420 |
| 2016/0093215 A1* | 3/2016 | Kiefer | G08G 1/0962 340/438 |

OTHER PUBLICATIONS

Written Opinion of the International Preliminary Examining Authority for PCT/US2015/045362 dated Aug. 31, 2016.
International Preliminary Report on Patentability for PCT/US2015/045362 dated Dec. 22, 2016.
Torralba, A. et. al., "Context-based vision system for place and object recognition", 2003, retrieved from http://www.cs.ubc.ca/~murphyk/Papers/iccv03.pdf.

* cited by examiner

REPUTATION SHARING SYSTEM USING AUGMENTED REALITY SYSTEMS

CROSS REFERENCE TO RELATED APPLICATIONS

This application is a 35 U.S.C. 371 of International Application of PCT PCT/US2015/045362, entitled REPUTATION SHARING SYSTEM USING AUGMENTED REALITY SYSTEMS, filed on Aug. 14, 2015, which claims the benefit under 35 U.S.C. § 119(e) of U.S. Provisional Application No. 62/057,536, filed Sep. 30, 2014, entitled SYSTEM AND METHOD FOR AUGMENTED REALITY REPUTATION SERVICE, reference of which is hereby incorporated in its entirety.

FIELD

The present disclosure relates to content sharing with the use of augmented reality equipment.

BACKGROUND

Reputation systems have been developed for use on the Internet. Such systems allow users to provide ratings for websites, items being bought and sold, news items, service providers, or ratings of other users. The objects being reviewed using these systems are objects that are themselves explicitly digital (such as news items) or else are given a digital identifier (such as a product identifier on Amazon or a seller's identifier on eBay). Existing reputation systems aggregate such information into a reputation score and present it to the users. Reputation systems can help improve the quality of digital interactions.

Other systems addresses information stored and retrieved according to location. For example, in Waze (www.waze.com) a user can provide information with respect to a location, such as an accident on a road. Other users are given that information if the location is relevant to them, such as it falls on a route that they are navigating.

In the off-line world, people sometimes share information with each other about physical objects in their environment that they find interesting (e.g. objects that are especially useful or threatening). Such sharing has not been fully supported in existing computer and mobile technologies.

SUMMARY

A method and system for operating a reputation sharing system is disclosed. The method includes detecting an object of interest at an augmented reality system. The method also includes receiving user annotation information, detecting and preparing object recognition information, and detecting and preparing motion information associated with the object of interest at the augmented reality system. The augmented reality system sends a set of information associated with the object of interest to a reputation service. The set of information includes the object recognition information, the motion information, and the annotation information. The augmented reality system may be implemented as part of a mobile system, which accompanies the user as they travel through various environments.

The detection of the object of interest may include one or more detection operations selected from a group of detection operations including: 1) detecting that the gaze of the user is fixed on the object for at least a threshold period of time; 2) detecting that the user has taken a photo of the object; and 3) detecting that the user has made a comment regarding the object. Receiving the user annotation information regarding the object of interest may include one or more annotation operations selected from the group of annotation operations including: 1) converting a comment of the user from speech to text; or 2) receiving a rating of the object. Preparing object recognition information may include one or more recognition operations selected from the group of recognition operations including: 1) recording a photograph of the object of interest; and 2) recording a video of the object of interest. Preparing motion information regarding the object may include one or more motion detection operations selected from the group of motion detection operations including: 1) detecting motion of the object of interest using a video camera; 2) detecting motion of the object of interest using a Doppler sensor; and 3) detecting motion of the object of interest using a depth range finder.

The method may further include determining a trajectory of the object of interest using at least the motion information. The trajectory of the object of interest may be used to predict one or more future locations of the object of interest. Information, including annotation information relating to the object of interest, may be transmitted to other users of the reputation service if one or more future locations of the object of interest is proximate one or more predicted or estimated locations of other users.

DETAILED DESCRIPTION

The reputation sharing systems and methods set forth below enable users to share information and/or opinions about a physical object with other users without necessarily requiring any preexisting standard (common) digital identifier for the physical object. Instead of a common digital identifier, the disclosed systems and methods use object recognition to identify objects about which information is available. In some examples, time and/or location information is used to aid in the identification of objects of interest. The time and/or location information may be aided by information on expected motion of objects of interest.

In various examples, the reputation sharing system receives an identification of some physical object as being interesting, and then creates and stores information useable for future visual recognition of the object. The reputation sharing system may store other information about the object, such as the location of the object at a particular time, a measured or estimated speed and direction of travel of the object, or other information. Comments made by a user about the object may be stored by the reputation sharing system as metadata. The system may operate to estimate the physical object's likely location range, a spatial region over which the object may be found with sufficiently high probability, within some period of time. The other users may be tracked and their likely location ranges or spatial regions over the same period of time may be estimated.

Still further, the reputation sharing system may identify other users whose actual or estimated locations will be proximate the likely location of the physical object. The other users are provided with a description of the physical object and any additional metadata. If and when that physical object arrives within observational range of the informed user, the user's augmented reality system, such as augmented reality glasses, can highlight the physical object and present the available metadata on the highlighted object.

Figure 1:
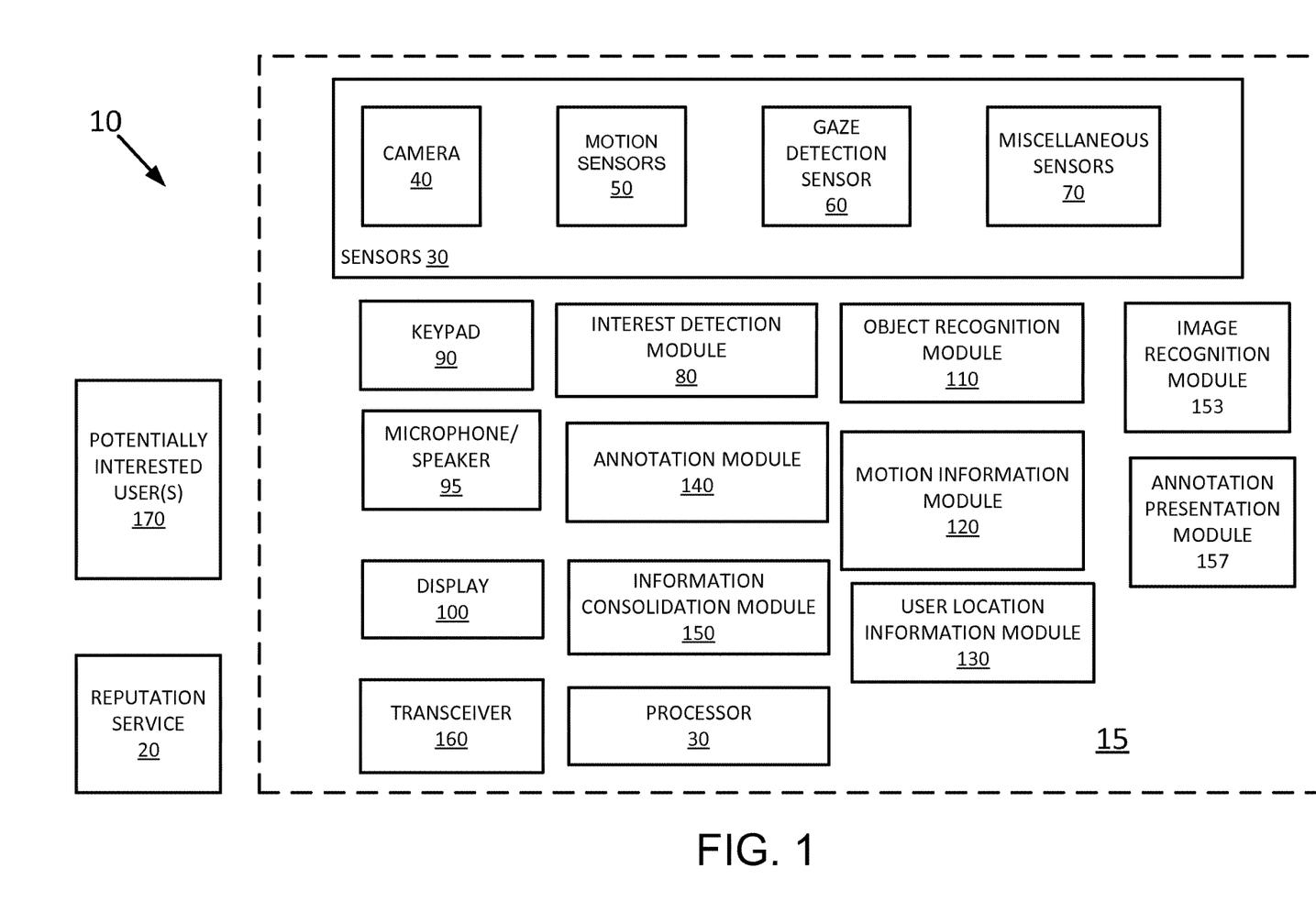
FIG. 1 is a block diagram of an exemplary reputation sharing system.

FIG. 1 is a block diagram of a reputation sharing system 10 including an exemplary augmented reality system 15 configured for interaction with at least one reputation service 20. In this example, various hardware and software elements are referred to as "modules" that carry out (i.e., perform, execute, and the like) various functions that are described in connection with the respective modules. A module may include hardware (e.g., one or more processors, one or more microprocessors, one or more microcontrollers, one or more microchips, one or more application-specific integrated circuits (ASICs), one or more field programmable gate arrays (FPGAs), one or more memory devices). Each described module may also include instructions executable for carrying out the one or more functions carried out by the respective module. Such instructions may take the form of or include hardware (i.e., hardwired) instructions, firmware instructions, software instructions, and/or the like, and may be stored in any suitable non-transitory computer-readable medium or media. This media may include RAM, ROM, EPROM, E²PROM, etc. In one example, the augmented reality system 15 may include Smart Glasses, such as those known as "Google Glass®" or another type of augmented reality headset.

The exemplary reputation sharing system 10 includes an augmented reality system 15, which may include one or more processors 30 that interact with and/or execute operations associated with various modules. The augmented reality system 15 may be configured for communication with the server of a reputations service 20.

As shown, the augmented reality system 15 may include a plurality of sensors 30. The plurality of sensors 30 may include one or more cameras 40, one or more object motion sensors 50, one or more gaze detection sensors 60, and/or additional miscellaneous sensors 70. The miscellaneous sensors 70 may include sensors such as those in a user's vehicle and/or external sensors such as those installed in a building. For example, a sensor could be used to provide information regarding whether it is cloudy outside.

An interest detection module 80 may be configured to detect whether the user is interested in an object within the field of view of one or more of the cameras 40. Interest may be detected in a variety of manners. For example, the user may activate one or more keys of the keypad 90 to trigger interest in the object. Additionally, or in the alternative, interest in an object may be triggered by the gaze detection sensor 60. To this end, the gaze detection sensor 60 may be implemented, for example, using eye motion tracking, an accelerometer indicating that the user's head has remained stable for a predetermined amount of time in a particular direction, and/or any other hardware/software suitable for detecting time variant parameters associated with the motion of the user's head. Still further, interest and an object may be determined based on the user's increased pupil dilation indicating surprise or interest in the object.

Still further, the user may provide audio input through a microphone 95 to identify and/or select the object of interest. In one example, the interest detection module 80 may be associated with a speech recognition module used to recognize one or more vocal commands and/or vocal comments provided by the user to trigger identification of an object of interest. Detection of the object of interest may also be based on the user taking a picture and/or video recording of the object using, for example, the one or more cameras 40. The user may also physically tap one or more components of the augmented reality system 15, such as tapping the smart glasses.

The particular object of interest may be highlighted for the user on a display 100. Such highlighting may include overlaying the object with a color mask, outlining the object with a color line, providing a visual indicator (e.g., circle, square, triangle, etc.) proximate the object of interest, and the like. If the highlighted object is not the true object of interest, the correct object may be obtained by, for example, cycling the highlighting of the various objects within the field of view until the correct object is highlighted. Cycling may occur, for example, in response to input from the keypad 90, vocal commands provided by the user through the microphone 95, execution of a reacquisition cycle using one or more of the sensors 30, or the like.

An object recognition module 110 may be configured to acquire and/or store information regarding physical properties of the object of interest. This information may include, for example, a photograph of the object, a video recording of the object, or any other information that may be used to visually recognize the object of interest. Visual features (e.g., color, size, texture, shape) can be part of the description. If the object is of a known type (e.g., "car" or "ambulance" or "otter" or "banyan tree"), then information identifying the type can be part of its description. Particular features of components of the object (e.g., "yellow car with a black striped hood" or "balloon with the letters RE/MAX") can form part of the description of the object. Explicit identifiers, where recognized, can also form part of an object's description. For example, a license plate on a car and the name of a ship can form part of the description.

A motion information module 120 may be configured to acquire and store motion information relating to the object of interest. To this end, motion data may be obtained from the motion sensors 50, such as, for example, a Doppler sensor, a depth range finder, or the like, at the augmented reality system 15. Motion information module 120 may also record information indicating that the object of interest is a stationary object, such as a tree or valley seen from a highway, falling behind the user as the user moves along the highway.

The motion information module 120 may use information provided by the sensors 30 to record information regarding a mobile object that is moving in a direction neither along nor opposite to the user's direction, such as a ship in a harbor or a balloon in the sky. Such information may include information regarding, for example, the current direction and speed of movement of the object.

The location of the user at any given time, such as location at which the initial acquisition of the object of interest occurred, may be recorded by the user location information module 130. The initial location of the object of interest may be determined in this manner. A GPS may be incorporated into and/or interface with the augmented reality system 15 for this purpose.

An annotation module 140 may be configured to acquire and store one or more annotations that are to be associated with the object of interest. For example, a voice recording of the user's comments may be provided as the annotation and associated with the object of interest by the annotation module 140. The annotation module 40 may also accept vocal comments from the user and convert them to text using speech-to-text recognition. The annotation module 140 may then associate the resulting text with the object of interest. Still further, annotations may be entered by the user through keypad 90.

Information stored about an object can include metadata about a user's reaction to an object. For example, the system can recognize and store words spoken by the user upon spotting the object, such as "crazy," "awesome" or "cute." The system can further store information regarding the user's facial expression upon spotting the object. Other relevant information can also be stored as metadata, such as information indicating that a truck is being driven dangerously.

An information consolidation module 150 may consolidate one or more of the following pieces of information relating to the object of interest: 1) object information from the object recognition module 110; 2) motion information from the motion information module 120; 3) location information from the user location information module 130; and/or 4) annotation information from the annotation module 140. The consolidated information may be accessed by, for example, processor 30 for wireless transmission by a transceiver 160 to the reputation service 20. As such, the transceiver 160 is configured to transmit at least portions of the consolidated information, such as the object recognition information, motion information, and annotation information associated with the object of interest to the reputation service 20. The reputation service 20 may transmit at least a portion the information and/or information derived from the consolidated information to one or more potentially interested users 170. The potentially interested users may have augmented reality systems similar to the augmented reality system 15 shown in FIG. 1.

The modules of FIG. 1 may also execute operations on information received from the reputation service 20. For example, an image recognition module 153 may acquire visual information from camera 40 and compare it against object recognition information received from the reputation service 20. When an object within the field of view of the camera 40 has physical object attributes corresponding to the object recognition information received from the reputation service 20, the image recognition module in 153 may highlight the recognized object on display 100, and/or use the speaker to notify the user of the presence, and/or activate a vibrating element that physically notifies the user of the presence of the physical object. The physical object information sent by the reputation service 20 and used to recognize the object may correspond to physical objects solely identified by the reputation service 20 and/or objects identified as objects of interest by other users.

Annotation information received from the reputation service 20 relating to the recognized object may be presented at the augmented reality system 15 using the annotation presentation module 140. The annotations may be presented using the speaker 95 and/or display 100. Presentation of the annotations to the user may occur, for example, upon: 1) automatic recognition of the object; 2) provision of a vocal command by the user; 3) provision of a command or gesture received at keypad 90; 4) notification from the reputation service 20 that the user is in proximity to an object identified by the reputation service; 5) and/or execution of a predetermined motion of the headset of the augmented reality system 15 by the user.

The arrangement and functionality of the foregoing modules described here may be altered from that shown in FIG. 1. For example, the functionality of two or more modules may be consolidated into fewer modules. Further, the particular information acquired by each of the modules may vary. Still further, the interaction between various modules may be different in other examples. Still further, fewer modules than those shown may be used if the functionality of the augmented reality system 15 is reduced.

Figure 2:
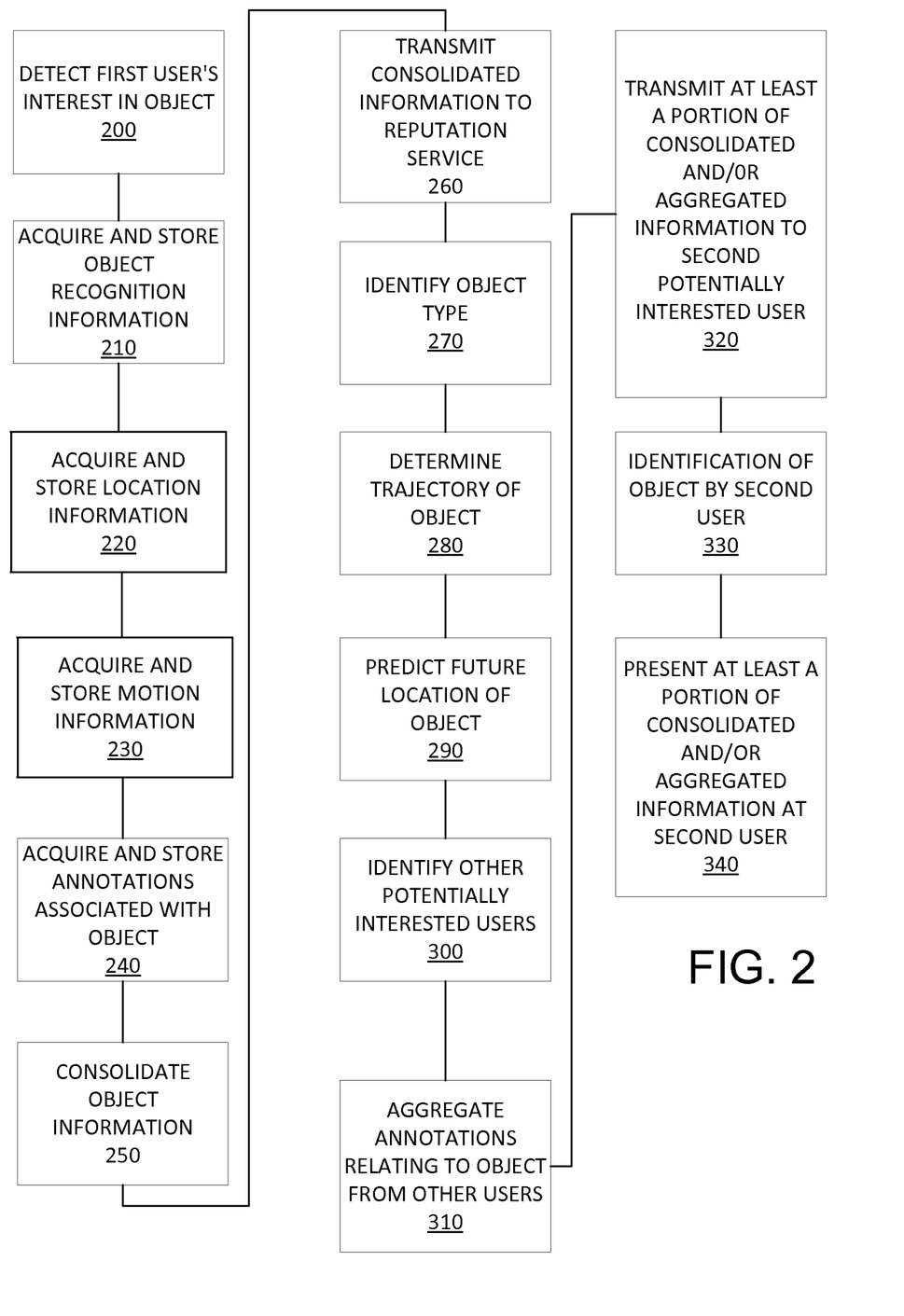
FIG. 2 is a flow chart showing various operations that may be executed by a reputation sharing system.

FIG. 2 is a flow chart showing various operations that may be executed by augmented reality system 15, reputation service 20, and the augmented reality systems of potentially interested users 160. In this example, the first user's interest in an object is detected at operation 200.

Information relating to the object of interest is acquired and stored in several operations. For example, object recognition information corresponding to one or more physical attributes of the object of interest, such as a picture, video, or other data corresponding to the visual aspects of the object of interest may be acquired and stored at operation 210. The location of the object of interest may be acquired and stored at operation 220. Information relating to the motion of the object of interest may be acquired and stored at operation 230.

Annotations (e.g. comments or ratings) relating to the object of interest may be acquired and stored at operation 240. Annotations may be used to mark objects of interest with transient information. For example, a first user can highlight an interesting tall ship near a bridge, note a family of alpacas grazing on the hill to the right, or provide instructions to go around a gnarled tree to see a rainbow over the valley. The first user can make verbal comments that are converted to a text annotation by a speech recognition system. Such comments can be provided to other users that are behind the first user on the same highway, because such users would be approaching the sight that the commenting user has seen. The acquired and stored object information is consolidated at operation 250 and transmitted to the reputation service 20 at operation 260.

The augmented reality system 15 may execute additional functions not shown here and/or omit various functions. However, many such functions may be offloaded to the reputation service 20 to reduce the computational load at the augmented reality system 15. At least some of the offloaded operations may occur at the reputation service 20.

At operation 270, the reputation service 20 may use the consolidated information to identify the type of object acquired by the augmented reality system 15. If the object is of a particular type, the reputation service 20 may automatically classify the object. For example, an object may be recognized as belonging to some known object type, such as a car. Knowledge of the terrain and location of the object of interest may also be used to assist in the object identification operation. For example, if the object of interest is located near a body of water, the reputation service 20 may narrow down the likely object types to those associated with a body of water, such as a boat, ship, dock, pier, waterfowl, bait store, marine animals, or the like.

At operation 280 the measured and/or estimated trajectory of the physical object of interest may be determined using the motion information provided by the augmented reality system 15. The trajectory may be determined using, for example velocity, acceleration, elevation, object type, etc., of the object of interest. For example, a truck moving on a highway in the same direction as the user and passing the user may be assumed to be proceeding along the highway and speeding ahead of the user. A truck moving on a highway in the opposite direction as the user and passing the user may be assumed to be proceeding along the highway and arriving at points behind the user on the highway. A truck moving on a highway (in the same or opposite direction as the user and passing the user) may be assumed to be proceeding along the highway in its current direction of travel and arriving at increasingly farther points on the highway with a diminishing probability, based on measurements such as: the distance from its current location to any potential location on the highway; the number of exits between the current location and any potential location on the highway; and/or general traffic statistics along that highway in the relevant direction, taking into account the given time and day and other features for which traffic statistics are available. The reputation system 20 may also incorporate knowledge of the terrain and the physical object in determining the trajectory. For example, the reputation service 20 may use knowledge that a ship would slow down as it approaches the port, or a typical ship is not likely to move for a while once it docks, or that a ferry would likely return to its original location soon after arriving at a port.

At operation 290, the reputation system 20 may predict one or more future locations of the object of interest. For example, in the case of road travel, the reputation service 20 can obtain the speed S (in mph, for example) of a vehicle proceeding on a highway using various techniques. The speed may be determined, for example, using a Doppler sensor or a depth range finder, at the augmented reality system 15. Additionally, or in the alternative, the reputation service 20 may estimate the speed of a vehicle based on speed limits, historic traffic patterns, or other information about the relevant stretch of road.

Once an estimated speed S is determined, the reputation service 20 may predict that the vehicle will continue to travel at a speed near S, for example in a range between 90% of S and 110% of S. The system may consider a time interval of interest, for example, 30 minutes. The predicted spatial region for the vehicle is along the current highway in the direction of travel of the vehicle, and ranges from a low estimate of 0.45*S miles from the current location to a high estimate of 0.55*S miles from the original location.

The predictions obtained at operation 290 may be used at operation 300 to identify other potentially interested users based on their projected locations. The set of all possible users able to receive information on an object may be rather large. As a result, it may be desirable to limit the users who will receive the information or who will be interested in receiving the information to those who are sufficiently associated with the first user. Users may be considered to be sufficiently associated when they are socially linked to the user who first observes the physical object. Users may also be considered to be sufficiently associated when they are closely connected over a social network or are within close proximity to one another. The reputation service may perform this determination by having registered users periodically share their location with the reputation service. When one user records information about a physical object, the reputation service may calculate the likely spatial region for the object over a time interval of interest. From the known locations of other users, or from the known locations and movements of the other users, the reputation service may determine which other users are within the spatial region of the physical object.

To determine whether the location of another user will coincide with the location of the object, the future location of the object may be compared with the predicted future location of the other user. The trajectory and location of the other user may be used in this determination. This information may be used to create a subset of potentially interested users meeting certain criteria. For example, the subset of potentially interested users may be limited to those users predicted to be within a certain distance of one or more predicted future locations of the object of interest within a certain time interval. The attributes of the other users and their social relationships with the first user and/or with one another may also be used as part of the selection process.

The set of all possible users able to receive information on an object based on their projected location may be rather large. As a result, it may be desirable to further limit the users qualified to receive the information to those who are sufficiently associated with the user providing the information. Users may be considered to be sufficiently associated when they are closely connected over a social network or are within close proximity to one another. Social relationship information may be stored, for example, at the reputation service 20.

In some implementations of the reputation sharing system 10, multiple annotations relating to the object of interest may be received from more than one source. For example, more than one user may have used their augmented reality system to provide annotations relating to the same object of interest. Further, the reputation service 20 may automatically add its own annotations if, for example, 1) the object is of a certain type, 2) the object meets certain location criterion, 3) the object meets certain motion and/or trajectory criterion, or 4) meets other criterion for which automatic annotations are suitable. When multiple annotations related to the object are provided by other users and/or automatically generated, at least some of the annotations from the first user, other users, and/or reputation service 20 related to the object of interest may be aggregated with one another at operation 310.

At operation 320, the reputation service 20 transmits at least a portion of the consolidated and/or aggregated information to one or more of the potentially interested users identified at operation 300. Here, the transmitted information is received at the augmented reality system of a second user. The information transmitted to the second user may include object recognition information that directly or indirectly corresponds to the object recognition information obtained by the first user. To this end, the object recognition information received by the reputation service from the first user may be modified or otherwise placed in a format that is suitable for image recognition of the object of interest by the augmented reality system at the second user. Likewise, the annotation information received by the reputation service from the first user may be modified or otherwise placed in a format that is suitable for use by the second user's augmented reality system.

In certain situations, the information transmitted to the reputation service by the first user may become obsolete over time. In such instances, the reputation service may determine a time period of interest for the object of interest. Before sending the object recognition information and annotation to the second user, the reputation service determines whether the time period of interest has expired. The object recognition information and annotation are sent to the second user only after determining that the time period of interest has not expired.

The augmented reality system at the second user may be similar to the augmented reality system 15 shown in FIG. 1. Visual information for objects within the field of view of second user's augmented reality system is acquired continuously or at spaced periodic and/or non-periodic intervals. At operation 330, the second user's augmented reality system identifies the object of interest within its field of view using the object recognition information sent from the reputation service 20. At least a portion of the consolidated and/or aggregated information, including information corresponding to the annotation information relating to the recognized object, is presented to the second user at operation 340. The annotation information may be presented audibly through a speaker and/or visually at a display of the second user's augmented reality system.

Figure 3:
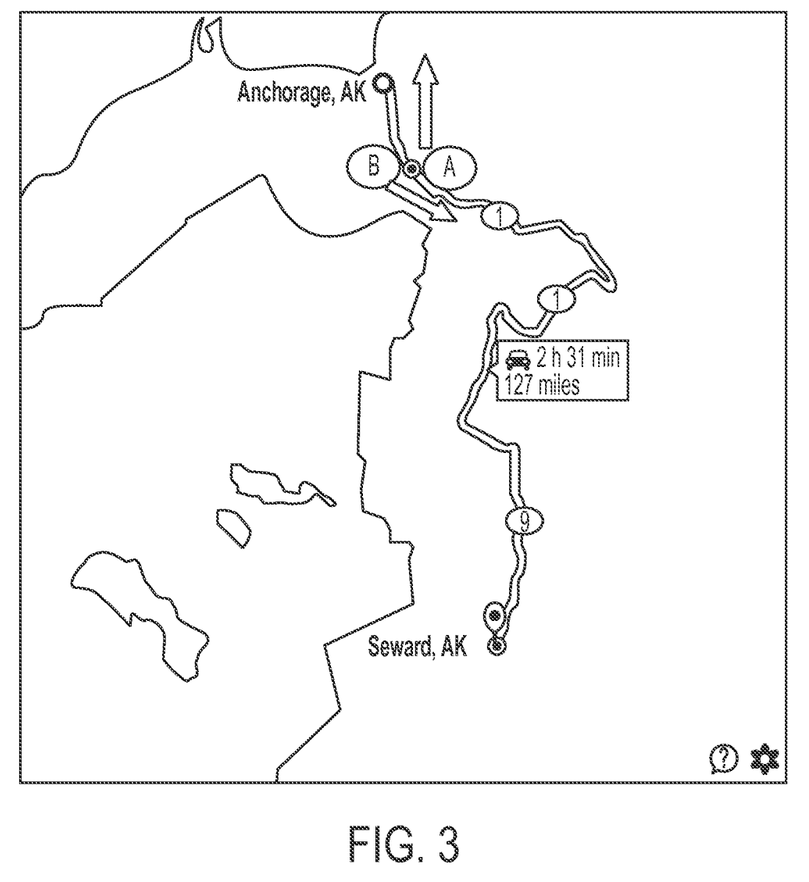
FIG. 3 to FIG. 6 show specific examples of the operation of the reputation sharing system.

Specific examples of the operation of the reputation sharing system are shown in FIGS. 3-6. In the map illustration of FIG. 3, the location of a first user is indicated by 'A'. A physical object is indicated by 'B'. As illustrated by the arrows of FIG. 3, the user A and object B are traveling along the same highway in opposite directions. User A observes the object and its trajectory along the highway. An augmented reality system of user A records information describing object B along with metadata provided by user A (such as a comment made by user A, the comment being either qualitative in nature by characterizing the object of interest as dangerous, interesting or amusing, etc., and/or quantitative in nature, such as by indicating an estimate of the speed and direction of travel of the object of interest). This information is shared with a reputation service, which may be implemented with one or more networked computer servers.

Figure 4:
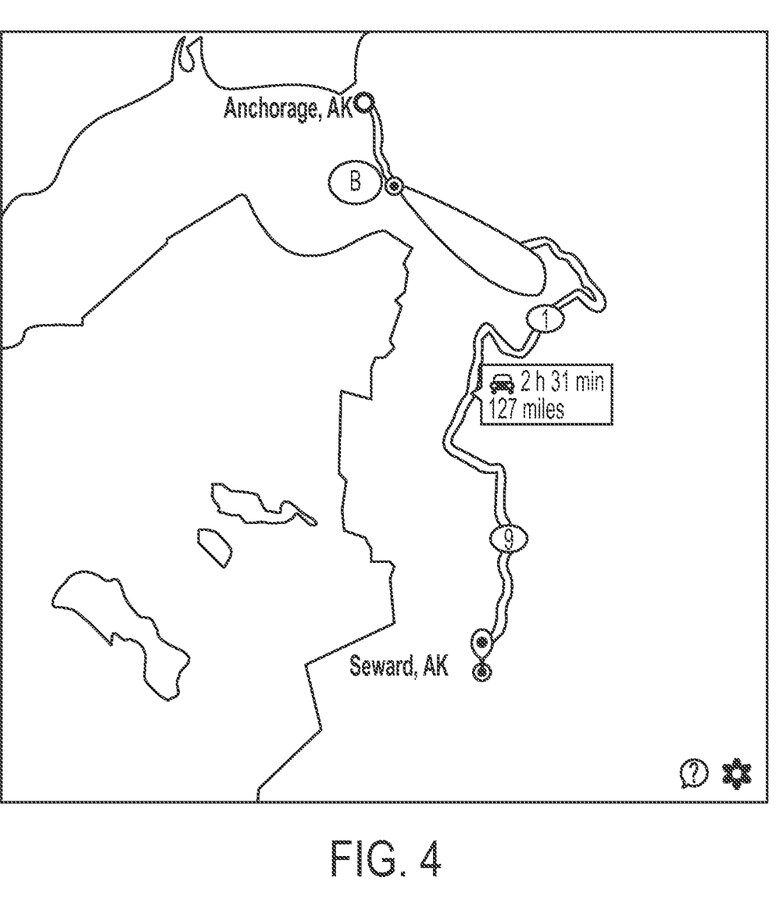
Figure 5:
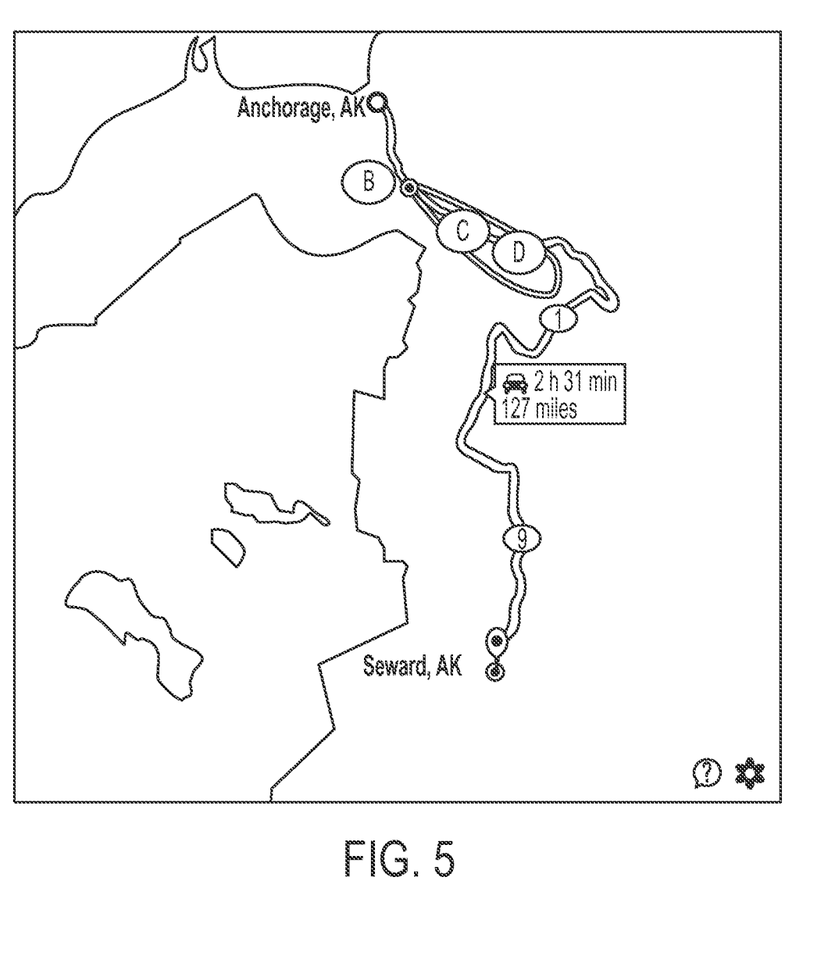

The reputation service determines where the physical object B is likely to be at various points in time. As illustrated in FIG. 4, for example, the reputation service may identify a region in which object B is likely to be found. As illustrated in FIG. 5, the reputation service may determine that other registered users C and D are located in the region in which object B is likely to be found. The reputation service may then transmit the information relating to object B to users C and D. Other users outside the expected location of object B may be excluded from this transmission.

Figure 6:
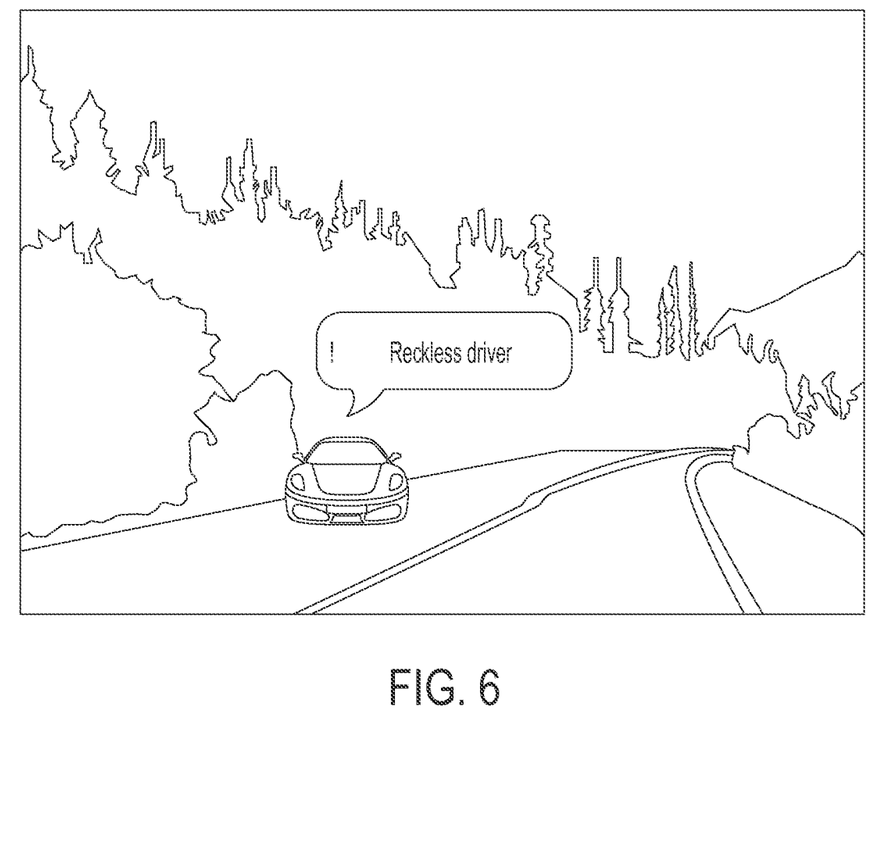

Consider an instance in which user C actually approaches the physical object B, and object B appears within the field of view of user C. In such a case, the augmented reality system of user C identifies the object B based on the information sent by the reputation service. The augmented reality system of user C then displays metadata about object B to user C in an overlay fashion. For example, FIG. 6 illustrates an instance in which object B is a car, and user A has provided metadata indicating that the car appears to be driven by a reckless driver. As illustrated in FIG. 6, user C, through an augmented reality interface, sees the overlay "reckless driver" as an annotation on object B. In some examples, the information is not presented on a user's augmented reality system unless the object of interest is in view. For example, an augmented reality system associated with user D may receive information on object B, but that information may not be displayed to user D unless object B comes into view and is recognized by user D's augmented reality system.

Figure 7:
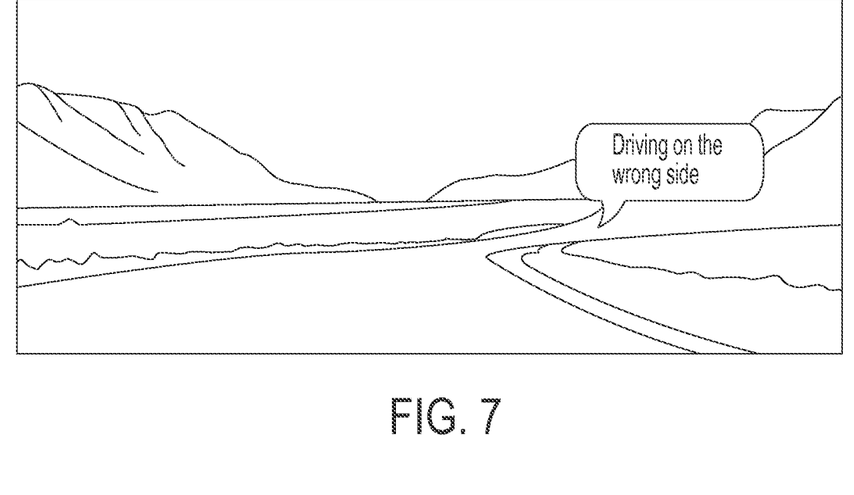
FIG. 7 illustrates an example in which a reputation sharing system may use information from multiple sensors and services to identify physical objects and capture their descriptions as well as object metadata.

FIG. 7 illustrates an example in which reputation sharing system uses information from multiple sensors (e.g., vehicle cameras) and services to identify physical objects and capture their descriptions and other metadata. In some examples, the reputation sharing system may aggregate metadata from multiple users with different levels of intelligence and summarization. Commenting users can be selected based on their social relationships with the users being informed. In some examples, the regions in which physical objects and users may be found can be estimated or measured using different techniques. In some embodiments, augmented information may be presented to a user even before the user views the object. For example, if a dangerous car is a mile away, the user can be provided with augmented information before the object itself becomes visible, as illustrated in FIG. 7, where the augmented reality information "Driving on the wrong side" is displayed even before the offending car becomes visible to the user.

Figure 8:
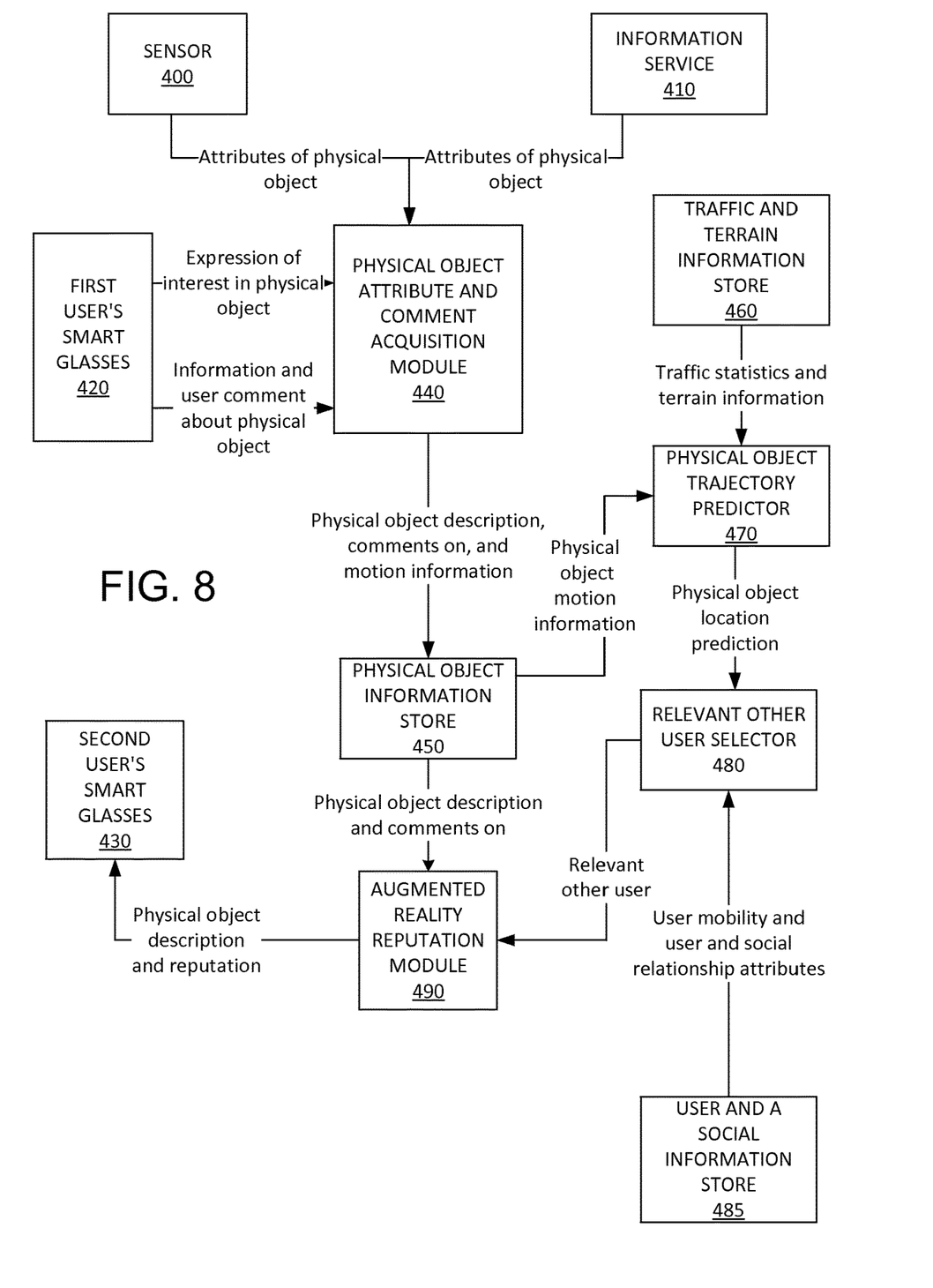
FIG. 8 illustrates another exemplary architecture for a reputation sharing system.

Another exemplary architecture for a reputation sharing system is shown in FIG. 8. As illustrated in FIG. 8, an augmented reality device associated with a user may be provided with one or more Sensors 400, which operate as modules through which functional modules obtain information about the environment. The augmented reality device may also interface with other sensors such as those in a user's vehicle or external sensors such as those installed in a building. For example, as noted above, a sensor could be used to provide information regarding whether it is cloudy outside.

An Information Service 410 may be included and implemented as one or more modules that provide additional metadata about a physical object of interest. For example, an information service could provide information about whether a plant is poisonous or whether a brown bear seen by a user is a grizzly bear or a Kodiak bear.

FIG. 8 also illustrates by way of example a First User's Smart Glasses 420 and a Second User's Smart Glasses, though it should be understood that the system can operate with any number of users. For example, in some use cases, the reputation sharing system operates with only a single user. At the other extreme, many thousands of users can be accommodated. Various different types of smart glasses can be employed, or other augmented reality interfaces can be used in place of smart glasses.

In the example of FIG. 8, the First User's Smart Glasses 420 capture the first user's expression of interest in a physical object, information about the physical object (such as its color), and comments by the first user about the physical object. The comments may be given explicitly (e.g., in spoken words) or implicitly (e.g., in facial expressions of the user).

The Second User's Smart Glasses 430 recognize a physical object based on a received description and present the received reputation of that object. For example, the Second User's Smart Glasses 430 could present summarized sentiment about a physical object by showing it in a bold outline colored red or green or yellow.

A Physical Object Attribute and Comment Acquisition Module 440 gathers up information relating to the physical object and when and where it was spotted and how it was moving. The Physical Object Attribute and Comment Acquisition Module 440 places such information in the Physical Object Information Store 450.

A Traffic and Terrain Information Store 460 captures information about traffic statistics and locations of relevant landmarks, such as highway exits, helipads, and seaports.

A Physical Object Trajectory Predictor 470 captures the necessary intelligence to produce predictions of the location of the physical object over some bounded future time intervals.

A Relevant Other Users Selector 480 takes in (1) a prediction of the physical object's location over time, (2) a prediction of the locations of potential other users, and (3) the attributes of users and their social relationships. Mobility and social relationship attributes are provided by the user and social information store 485. The Relevant Other Users Selector 480 determines (1) which of the potential other users will be in the vicinity of the physical object within the appropriate time interval and (2) which of those other users have a suitable relationship with the first user. It determines such other users to be relevant as prospective recipients of information about the physical object.

The Augmented Reality Reputation Module 490 aggregates comments on the physical object to determine a reputation of the object (e.g., as numeric sentiment scores; audio, still, and video media; facial expressions of users). It provides the physical object's description (relevant for identifying the physical object) along with the computed reputation to the smart glasses of relevant other users.

Figure 9:
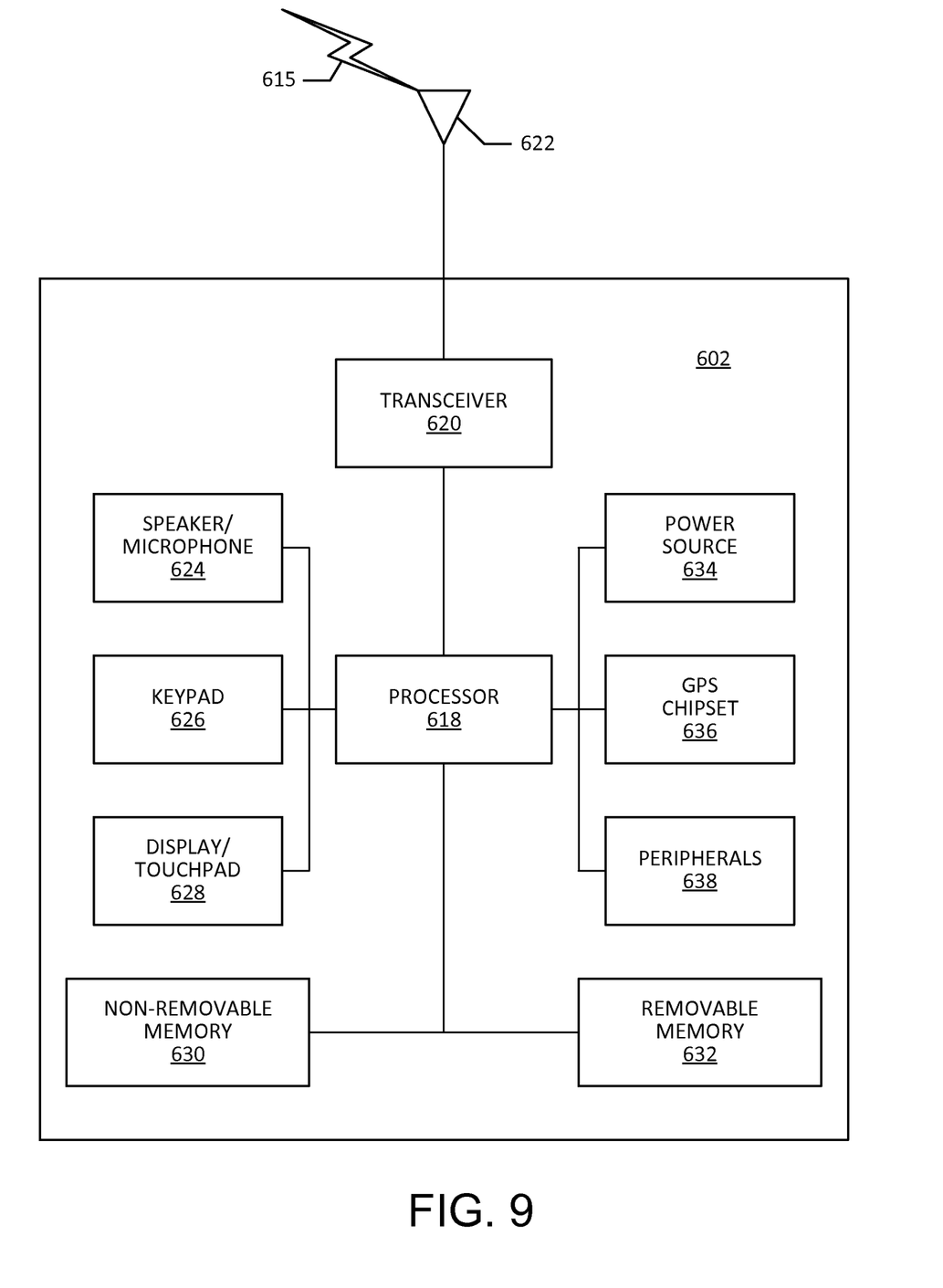
FIG. 9 illustrates an exemplary wireless system that may be used in a reputation sharing system.

The systems and methods described herein may be implemented in a wireless transmit receive unit (WTRU), such as WTRU 602 illustrated in FIG. 9. For example, an augmented reality headset, such as smart glasses or other augmented reality interface, may be implemented using one or more software modules on a WTRU.

As shown in FIG. 9, the WTRU 602 may include a processor 618, a transceiver 620, a transmit/receive element 622, audio transducers 624 (preferably including at least two microphones and at least two speakers, which may be earphones), a keypad 626, a display/touchpad 628, a non-removable memory 630, a removable memory 632, a power source 634, a global positioning system (GPS) chipset 636, and other peripherals 638. It will be appreciated that the WTRU 602 may include any sub-combination of the foregoing elements while remaining consistent with an embodiment. The WTRU may communicate with nodes such as, but not limited to, base transceiver station (BTS), a Node-B, a site controller, an access point (AP), a home node-B, an evolved home node-B (eNodeB), a home evolved node-B (HeNB), a home evolved node-B gateway, and proxy nodes, among others.

The processor 618 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 618 may perform signal coding, data processing, power control, input/output processing, and/or any other functionality that enables the WTRU 602 to operate in a wireless environment. The processor 618 may be coupled to the transceiver 620, which may be coupled to the transmit/receive element 622. While FIG. 9 depicts the processor 618 and the transceiver 620 as separate components, the processor 618 and the transceiver 620 may be integrated together in an electronic package or chip.

The transmit/receive element 622 may be configured to transmit signals to, or receive signals from, a node over the air interface 615. For example, the transmit/receive element 622 may be an antenna configured to transmit and/or receive RF signals. In another example, the transmit/receive element 622 may be an emitter/detector configured to transmit and/or receive IR, UV, or visible light signals, as examples. In yet another example, the transmit/receive element 622 may be configured to transmit and receive both RF and light signals. To this end, the transmit/receive element 622 may be configured to transmit and/or receive any combination of wireless signals.

Additionally, although the transmit/receive element 622 is depicted in FIG. 9 as a single element, the WTRU 602 may include any number of transmit/receive elements 622. For example, the WTRU 602 may employ MIMO technology. Thus, in one example, the WTRU 602 may include two or more transmit/receive elements 622 (e.g., multiple antennas) for transmitting and receiving wireless signals over the air interface 615.

The transceiver 620 may be configured to modulate the signals that are to be transmitted by the transmit/receive element 622 and to demodulate the signals that are received by the transmit/receive element 622. As noted above, the WTRU 702 may have multi-mode capabilities. Thus, the transceiver 620 may include multiple transceivers for enabling the WTRU 602 to communicate via multiple RATs, such as UTRA and IEEE 802.11, as examples.

The processor 618 of the WTRU 602 may be coupled to, and may receive user input data from, the audio transducers 624, the keypad 626, and/or the display/touchpad 628 (e.g., a liquid crystal display (LCD) display unit or organic light-emitting diode (OLED) display unit). The processor 618 may also output user data to the speaker/microphone 624, the keypad 626, and/or the display/touchpad 628. In addition, the processor 618 may access information from, and store data in, any type of suitable memory, such as the non-removable memory 630 and/or the removable memory 632. The non-removable memory 630 may include random-access memory (RAM), read-only memory (ROM), a hard disk, or any other type of memory storage device. The removable memory 632 may include a subscriber identity module (SIM) card, a memory stick, a secure digital (SD) memory card, and the like. In other embodiments, the processor 618 may access information from, and store data in, memory that is not physically located on the WTRU 602, such as on a server or a home computer (not shown).

The processor 618 may receive power from the power source 634, and may be configured to distribute and/or control the power to the other components in the WTRU 602. The power source 634 may be any suitable device for powering the WTRU 602. As examples, the power source 634 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 618 may also be coupled to the GPS chipset 636, which may be configured to provide location information (e.g., longitude and latitude) regarding the current location of the WTRU 602. In addition to, or in lieu of, the information from the GPS chipset 636, the WTRU 602 may receive location information over the air interface 615 from a base station and/or determine its location based on the timing of the signals being received from two or more nearby base stations. It will be appreciated that the WTRU 602 may acquire location information by way of any suitable location-determination method while remaining consistent with an embodiment.

The processor 618 may further be coupled to other peripherals 638, which may include one or more software and/or hardware modules that provide additional features, functionality and/or wired or wireless connectivity. For example, the peripherals 638 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 10:
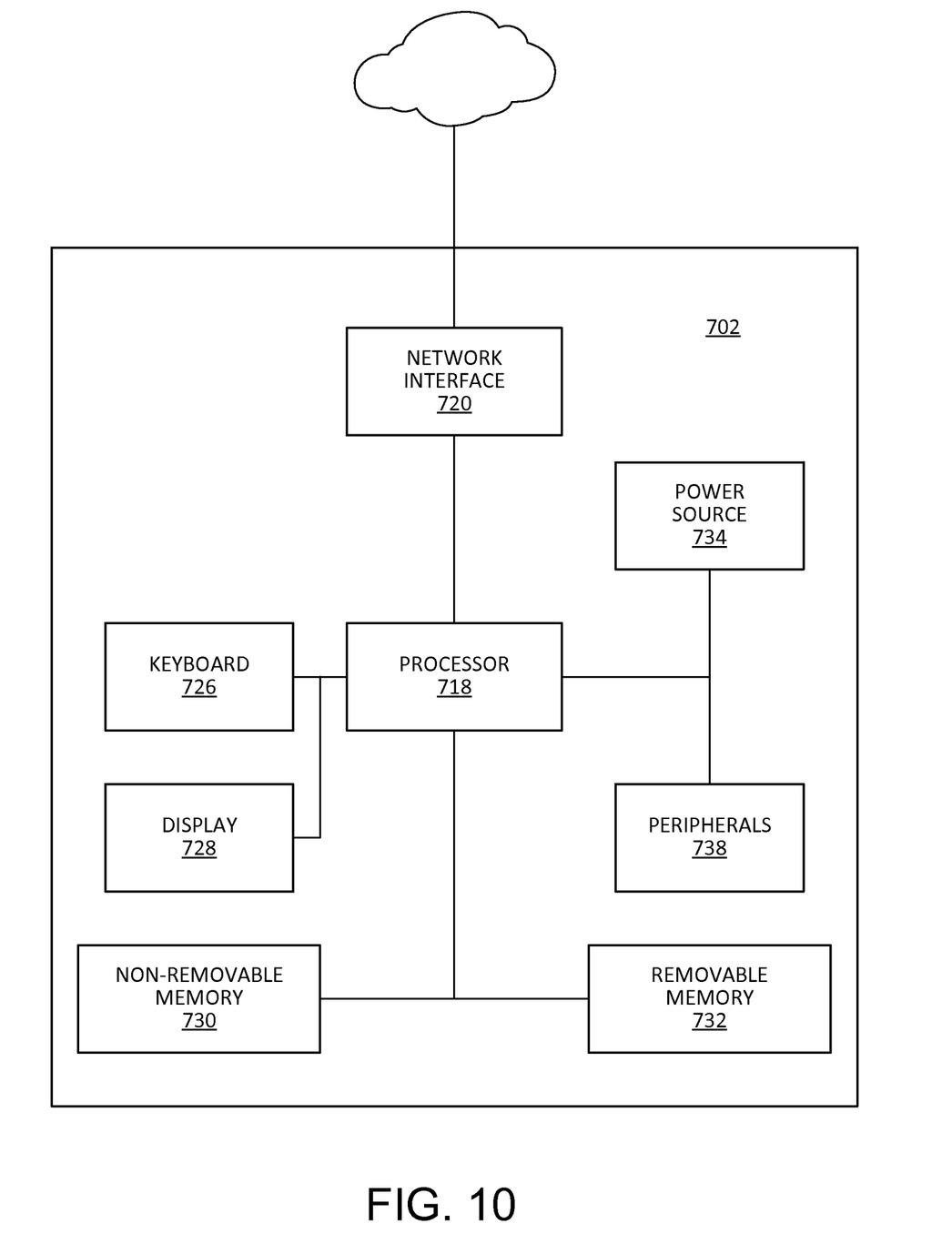
FIG. 10 illustrates an exemplary server that may be used in a reputation sharing system.

In some examples, the reputation service may be implemented in a networked server, such as server 702 illustrated in FIG. 10. To this end, the reputation service may be implemented as hardware and software modules on a networked server.

As shown in FIG. 10, the server 702 may include a processor 718, a network interface 720, a keyboard 726, a display 728, a non-removable memory 730, a removable memory 732, a power source 734, and other peripherals 738. The server 702 may include any sub-combination of the foregoing elements while remaining consistent the desired functionality of the reputation service. The server may be in communication with the internet and/or with proprietary networks.

The processor 718 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 718 may perform signal coding, data processing, power control, input/output processing, and/or any other functionality that enables the server 702 to operate in a wired or wireless environment. The processor 718 may be coupled to the network interface 720. While FIG. 10 depicts the processor 718 and the network interface 720 as separate components, the processor 718 and the network interface 720 may be integrated together in an electronic package or chip.

The processor 718 of the server 702 may be coupled to, and may receive user input data from, the keypad 726, and/or the display 728 (e.g., a liquid crystal display (LCD) display unit or organic light-emitting diode (OLED) display unit). The processor 718 may also output user data to the display/touchpad 728. In addition, the processor 718 may access information from, and store data in, any type of suitable memory, such as the non-removable memory 730 and/or the removable memory 732. The non-removable memory 730 may include random-access memory (RAM), read-only memory (ROM), a hard disk, or any other type of memory storage device. In other examples, the processor 718 may access information from, and store data in, memory that is not physically located at the server 702, such as on a separate server (not shown).

The processor 718 may receive power from the power source 734, and may be configured to distribute and/or control the power to the other components in the server 702. The power source 734 may be any suitable device for powering the server 702, such as a power supply connectable to a power outlet.

The reputation sharing system 10 may be employed in various contexts. Use cases for the reputation sharing system 10 may include the following examples.

Automotive Use Case—A user in a car (a driver or passenger) may notice that a car is weaving through traffic and proceeding recklessly. The user utters some phrase such as "crazy driver!" The user's smart glasses mark the offending car along with a negative rating (or a danger rating). The glasses upload the car's image and the rating to a traffic application reputation server. The application knows which of its users are farther ahead of the first user on the same highway.

The reputation service may warn the users ahead to be attentive since a potentially dangerous car is approaching them from behind. Note that in this embodiment, there is no requirement for the user ahead to employ augmented reality technology, as the warning may be provided through other means (e.g., an audio warning, or an indication on a map display of a navigation system).

In one example, the reputation service sends identifying information (e.g., license plate or model and color) about the offending car to the vehicles of the users ahead. When the same car approaches any of the users ahead (now warned), the user's vehicle can show the offending car as highlighted in red in the rearview mirror (or a display from a rear-facing camera on the vehicle). The user ahead can therefore be extra attentive or move out of the way of the offending car. Notice that the match with the offending vehicle does not need to be perfect in that a false positive identification can be acceptable in this use case.

In some examples, the reputation service may refrain from sending such warnings if there has been only one complaint, but may do so when more than a certain number of users have complained within a sufficiently short interval.

Transient Sights Use Case—

Users may use annotations (e.g. comments or ratings) to mark objects of interest with transient information. For example, a first user can highlight an interesting tall ship near a bridge, note a family of alpacas grazing on the hill to the right, or provide instructions to go around a gnarled tree to see a rainbow over the valley. The first user can make verbal comments that are converted to a text annotation by a speech recognition system. Such comments can be provided to other users that are behind the first user on the same highway, because such users would be approaching the sight that the commenting user has seen.

For a transient sight, the information will likely become outdated after a certain period (e.g., the tall ship may go away, the alpacas may scamper off, and the rainbow may fade out). Therefore, the reputation server may operate to send the information only those users who are not too far behind the given user, or whose travel time to the marked location is not too excessive.

The information could be held active for a predetermined amount of time, or an amount of time specified by the commenting user, depending on the particular sight. For example, for a tall-ship spotter use case, it might sensible to use a period of one hour whereas for a rainbow spotter use case, 15 minutes may be more appropriate. As noted with regard to the automotive use case, the system may consolidating the comments of multiple users and may refrain from providing an alert except where more than one user has identified a sight.

Kitchen Use Case—Users may mark kitchen objects with relevant information. For example, a user may indicate that a particular burner heats more on the left, that a particular knife is ceramic and is especially sharp, that a particular pot's handle can overheat, or that a particular blender does not deal well with ice. Such comments can be consolidated into a summary reputation of the objects.

Pets and Children Use Case—

Users may mark pets and young children with relevant information. For example, a particular dog encountered by a user on a trail can be marked as aggressive. A child at a playground can be marked as having twisted his wrist, so that nearby adults can take note to be careful with the injured child. A child can be marked as allergic to applesauce or other food items, so that adults can take care to keep the child away from allergens. Such comments can be consolidated into a summary reputation of a pet or child.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising, at a first augmented-reality client device:
   determining a location of the first client device;
   receiving user input selecting a moving object of interest;
   receiving from the user an annotation for the selected moving object of interest;
   capturing video of the moving object of interest;
   preparing object recognition information for the moving object of interest from the captured video;
   determining a direction of travel of the moving object of interest; and
   sending, to a reputation service, (i) information indicating the location of the first client device (ii) the object recognition information, (iii) direction information indicating the direction of travel of the moving object of interest, and (iv) the annotation.

2. The method of claim 1, wherein the user annotation is a text annotation.

3. The method of claim 1, wherein the moving object of interest is a car, and the object recognition information includes license plate information of the car.

4. The method of claim 1, further comprising, at the reputation service:
   based at least on the location of the first client device and the direction information, predicting a future location of the moving object of interest;
   identifying a second client device in proximity to the predicted future location of the moving object of interest; and
   providing, to the second client device, the object recognition information and the annotation.

5. The method of claim 4 wherein predicting the future location of the moving object of interest is performed in part based on historic traffic patterns.

6. The method of claim 4 wherein predicting the future location of the moving object of interest is performed in part based on road map data.

7. The method of claim 1, wherein the direction of travel of the moving object of interest is determined based on the captured video.

8. A method for operating a reputation service comprising:
   receiving, from a first client device (i) information indicating the location of the first client device (ii) object recognition information of a moving object of interest, (iii) direction information indicating a direction of travel of the moving object of interest, and (iv) an annotation for the moving object of interest;
   based at least on the location of the first client device and the direction information, predicting a future location of the moving object of interest;
   receiving information indicating a location of a second client device;
   in response to a determination that the second client device is in proximity to the predicted future location of the moving object of interest, providing, to the second client device, the object recognition information and the annotation.

9. The method of claim 8, wherein the reputation service does not send the direction information to the second client device.

10. The method of claim 8, wherein the annotation is a text annotation.

11. The method of claim 8, wherein the moving object of interest is a car, and the object recognition information includes license plate information of the car.

12. The method of claim 8 wherein predicting the future location of the moving object of interest is performed in part based on historic traffic patterns.

13. The method of claim 8 wherein predicting the future location of the moving object of interest is performed in part based on road map data.

14. The method of claim 9, further comprising:
   from each of a plurality of client devices, receiving location information, object recognition information, and annotation information corresponding to a respective object;
   based at least in part on the location information and the object recognition information, identifying annotations that correspond to the moving object of interest; and
   aggregating the identified annotations;
   wherein the aggregated annotations are provided to the second client device.

15. The method of claim 10, wherein the object recognition information and the annotation are sent to the second client device only in response to a determination that there is a social networking relationship between a user of the first client device and a user of the second client device.

16. A first augmented reality client device configured to perform a method comprising:
   determining a location of the first client device;
   receiving user input selecting a moving object of interest;
   receiving from the user an annotation for the selected moving object of interest;
   capturing video of the moving object of interest;
   preparing object recognition information for the moving object of interest from the captured video;
   determining a direction of travel of the moving object of interest; and
   sending, to a reputation service, (i) information indicating the location of the first client device (ii) the object recognition information, (iii) direction information indicating the direction of travel of the moving object of interest, and (iv) the annotation.

* * * * *